(12) United States Patent
Hamner

(10) Patent No.: US 10,394,643 B2
(45) Date of Patent: Aug. 27, 2019

(54) DISTRIBUTED RUN-TIME AUTO-CALCULATION OF MEASUREMENT UNCERTAINTY

(71) Applicant: NATIONAL INSTRUMENTS CORPORATION, Austin, TX (US)

(72) Inventor: Robert W. Hamner, Austin, TX (US)

(73) Assignee: National Instruments Corporation, Austin, TX (US)

( * ) Notice: Subject to any disclaimer, the term of this patent is extended or adjusted under 35 U.S.C. 154(b) by 197 days.

(21) Appl. No.: 15/678,929

(22) Filed: Aug. 16, 2017

(65) Prior Publication Data

US 2019/0056982 A1 Feb. 21, 2019

(51) Int. Cl.
G06F 11/00 (2006.01)
G06F 11/07 (2006.01)

(52) U.S. Cl.
CPC ........ G06F 11/079 (2013.01); G06F 11/0793 (2013.01)

(58) Field of Classification Search
CPC .......................... G06F 11/079; G06F 11/0793
See application file for complete search history.

(56) References Cited

U.S. PATENT DOCUMENTS

| 8,825,444 | B1* | 9/2014 | Rovira | G05B 23/024 |
| | | | | 702/104 |
| 9,021,333 | B1* | 4/2015 | Northcott | G06F 11/0793 |
| | | | | 714/766 |
| 2005/0083512 | A1* | 4/2005 | Stierle | G01C 15/002 |
| | | | | 356/4.01 |
| 2006/0167643 | A1* | 7/2006 | Casto | G01R 35/005 |
| | | | | 702/85 |
| 2007/0214261 | A1* | 9/2007 | Kikuchi | G06F 11/3419 |
| | | | | 709/224 |
| 2008/0125982 | A1 | 5/2008 | Yoshihiro et al. | |
| 2012/0109566 | A1 | 5/2012 | Adamian | |
| 2015/0144758 | A1* | 5/2015 | Kolokotronis | H01Q 1/1228 |
| | | | | 248/282.1 |
| 2015/0177315 | A1 | 6/2015 | Lim et al. | |
| 2015/0339127 | A1* | 11/2015 | Lee | G06F 9/4411 |
| | | | | 713/1 |
| 2017/0060656 | A1* | 3/2017 | Bhattacharya | G06F 11/079 |
| 2017/0124448 | A1* | 5/2017 | Engel | G06F 11/00 |
| 2017/0200088 | A1* | 7/2017 | Yang | G06N 7/005 |

FOREIGN PATENT DOCUMENTS

CN 102043757 5/2011

* cited by examiner

*Primary Examiner* — Joshua P Lottich
(74) *Attorney, Agent, or Firm* — Meyertons Hood Kivlin Kowert and Goetzel PC; Jeffrey C. Hood; Luke S. Langsjoen

(57) ABSTRACT

System and method for auto-calculating uncertainty of a measurement performed by a measurement device. The measurement device initiates a measurement or measurements. In response to the measurement initiation, a driver of the measurement device sends an error specification request to each of a plurality of hardware modules involved in the measurement. Each of the plurality of hardware modules determines the requested error specifications based on a current configuration of the respective hardware module. The measurement device then calculates an uncertainty associated with the measurement or measurements based on the error specifications.

20 Claims, 13 Drawing Sheets

DISTRIBUTED RUN-TIME AUTO-CALCULATION OF MEASUREMENT UNCERTAINTY

FIELD OF THE INVENTION

Embodiments described herein relate to the field of measurement, and more particularly to a system and method of auto-calculating measurement uncertainty.

DESCRIPTION OF THE RELATED ART

When a measurement device, such as a benchtop (e.g., boxed or standalone) or PXI (PCI (Peripheral Component Interconnect) eXtensions for Instrumentation) instrument, is used with or in an automation system or application, e.g., via a programming/sequencing environment, the measurement device's configuration state (or simply "configuration") may be altered by using the device's physical front panel or through a software application (that provides a "soft front panel") in order to debug the automated test or device under test. In some current implementations, the user may not know of all the configuration changes that occurred (were made) while debugging.

Altering the configuration of a measurement device may correspondingly alter the expected uncertainty in the device measurements. Quantitatively calculating the effect of a configuration change on the measurement uncertainty typically requires considerable time and computational effort. Improvements in the field of dynamic measurement uncertainty calculation are therefore desirable.

SUMMARY

Various embodiments of a system and method for auto-calculating measurement uncertainty for measurement devices are presented below.

In some embodiments, a measurement device initiates one or more measurements. In response to initiating the one or more measurements, the measurement device may automatically send one or more request messages to each of a plurality of modules involved in the one or more measurements. In some embodiments, the request messages specify a type and/or unit of error specifications required for calculating uncertainty in the one or more measurements. Each of the plurality of modules may determine the requested error specifications based on a current configuration of the respective module.

In some embodiments, the measurement device may determine an uncertainty in the one or more measurements based on the error specifications.

Note that the techniques described herein may be implemented in and/or used with a number of different types of devices, including but not limited to a standalone instrument, a module in a chassis, a chassis with a plurality of modules, or a device that includes a software component, executable on a host computer, such as computer system, and a hardware component, such as measurement device, coupled to the host computer.

This Summary is intended to provide a brief overview of some of the subject matter described in this document. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the described embodiments can be obtained when the following detailed description is considered in conjunction with the following drawings, in which.

Figure 1A:
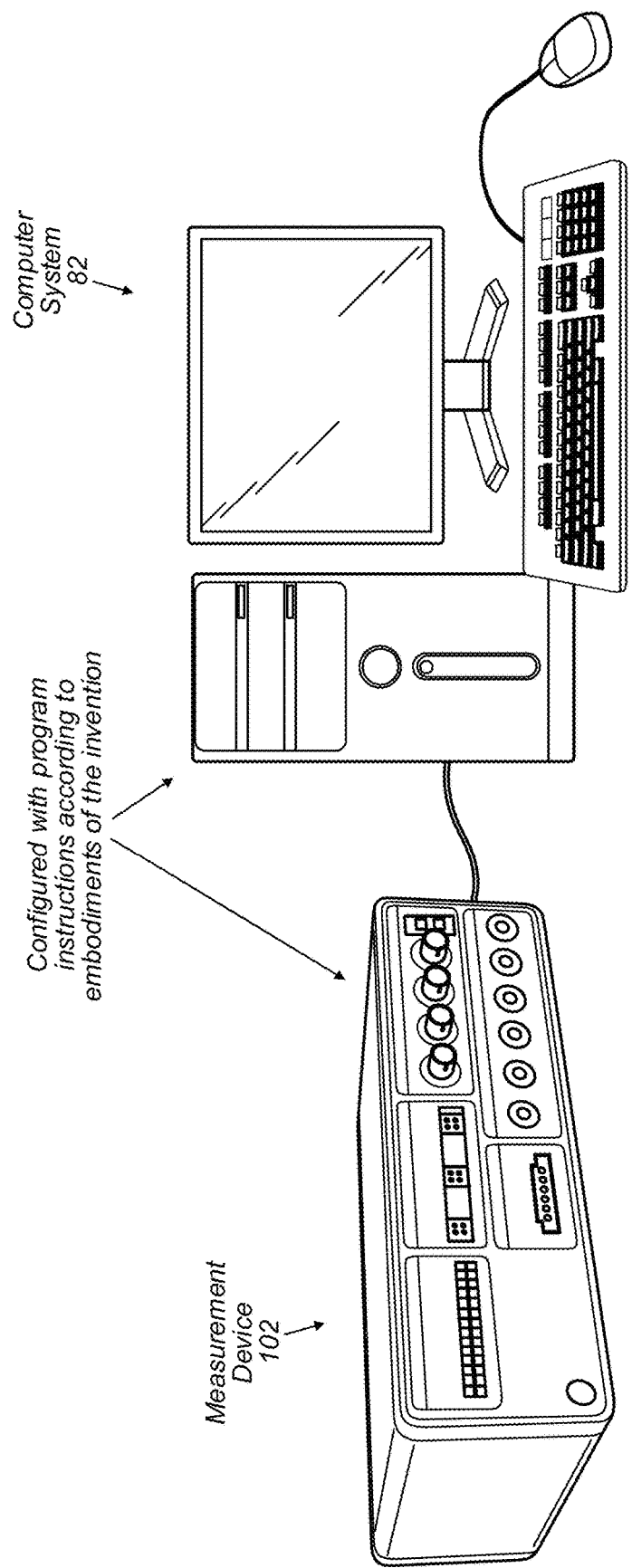
FIG. 1A illustrates an exemplary system configured to implement some embodiments described herein.

While embodiments described herein are susceptible to various modifications and alternative forms, specific embodiments thereof are shown by way of example in the drawings and are herein described in detail. It should be understood, however, that the drawings and detailed description thereto are not intended to limit the scope of the particular form disclosed, but on the contrary, the intention is to cover all modifications, equivalents and alternatives falling within the spirit and scope of the described embodiments as defined by the appended claims.

DETAILED DESCRIPTION OF THE INVENTION

Terms

The following is a glossary of terms used in the present application:

Memory Medium—Any of various types of non-transitory computer accessible memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Program—the term "program" is intended to have the full breadth of its ordinary meaning. The term "program" includes 1) a software program which may be stored in a memory and is executable by a processor or 2) a hardware configuration program useable for configuring a programmable hardware element.

Graphical Program—A program comprising a plurality of interconnected nodes or icons, wherein the plurality of interconnected nodes or icons visually indicate functionality of the program. The interconnected nodes or icons are graphical source code for the program. Graphical function nodes may also be referred to as blocks.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW®, DasyLab™, DIADem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks (i.e., nodes) or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks or nodes are often referred to as the block diagram portion of the graphical program.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes, terminal nodes, structure nodes, etc. Nodes may be connected together in a graphical program by connection icons or wires.

Data Flow Program—A Software Program in which the program architecture is that of a directed graph specifying the flow of data through the program, and thus functions execute whenever the necessary input data are available. Said another way, data flow programs execute according to a data flow model of computation under which program functions are scheduled for execution in response to their necessary input data becoming available. Data flow programs can be contrasted with procedural programs, which specify an execution flow of computations to be performed. As used herein "data flow" or "data flow programs" refer to "dynamically-scheduled data flow" and/or "statically-defined data flow".

Graphical Data Flow Program (or Graphical Data Flow Diagram)—A Graphical Program which is also a Data Flow Program. A Graphical Data Flow Program comprises a plurality of interconnected nodes (blocks), wherein at least a subset of the connections among the nodes visually indicate that data produced by one node is used by another node. A LabVIEW VI is one example of a graphical data flow program. A Simulink block diagram is another example of a graphical data flow program.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are configured to acquire and/or store data. A measurement device may also optionally be further configured to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further configured to perform control functions, e.g., in response to analysis of the acquired or stored data. For example, the measurement device may send a control signal to an external system, such as a motion control system or to a sensor, in response to particular data. A measurement device may also be configured to perform automation functions, i.e., may receive and analyze data, and issue automation control signals in response.

Functional Unit (or Processing Element)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

FIG. 1A—Computer System

FIG. 1A illustrates an exemplary system configured to perform methods described herein, according to some embodiments. As may be seen, this exemplary system includes a measurement device 102 coupled to a host computer system 82. The measurement device 102 may be any type of measurement device desired. For example, in various embodiments, the measurement device may be or include one or more of: a standalone instrument, a module in a chassis, a chassis with a plurality of modules, or a device that includes a software component, executable on a host computer, such as computer system 82, and a hardware component, such as measurement device 102, coupled to the host computer. Note that, while in the embodiment shown, the measurement device is coupled to the host computer via a cable, in other embodiments, other communicative coupling means may be used, e.g., a wireless connection, a local area network (LAN), or a wide area network (WAN), such as the Internet, among others.

As shown in FIG. 1A, the computer system 82 may include a display device configured to display the graphical program as the graphical program is created and/or executed. The display device may also be configured to display a graphical user interface or front panel of the graphical program during execution of the graphical program. The graphical user interface may comprise any type of graphical user interface (GUI), e.g., depending on the computing platform. In one embodiment, the GUI may be or include a soft front panel (SFP) for the measurement device that implements a software based front panel interface for the measurement device.

The computer system 82 may include at least one memory medium on which one or more computer programs or software components may be stored, according some embodiments. For example, the memory medium may store one or more programs, e.g., text based or graphical programs, which are executable to perform the methods described herein. As noted above, in some embodiments, the memory medium may store a software component of a measurement device that is executable to control or otherwise operate with the measurement device, e.g., a driver program and/or application program. Additionally, the memory medium may store a (possibly) graphical programming development environment application used to create and/or execute such programs. The memory medium may also store operating system software, as well as other software for operation of the computer system.

The computer system 82 may be any of various types as desired, e.g., a workstation, a personal computer, a mobile computing device, such as a tablet computer or smart phone, a controller in a chassis, and so forth. In some embodiments, the computer system 82 and measurement device 102 may execute a (possibly graphical) program in a distributed fashion. For example, computer 82 may execute a first portion of a block diagram of a graphical program and computer system 90 may execute a second portion of the block diagram of the graphical program. As another example, computer 82 may display the graphical user interface of a program and measurement device 102 may execute the functional body of the program, e.g., the block diagram of the graphical program.

Various embodiments further include receiving or storing instructions and/or data implemented in accordance with the foregoing description upon a carrier medium.

Figure 1B:
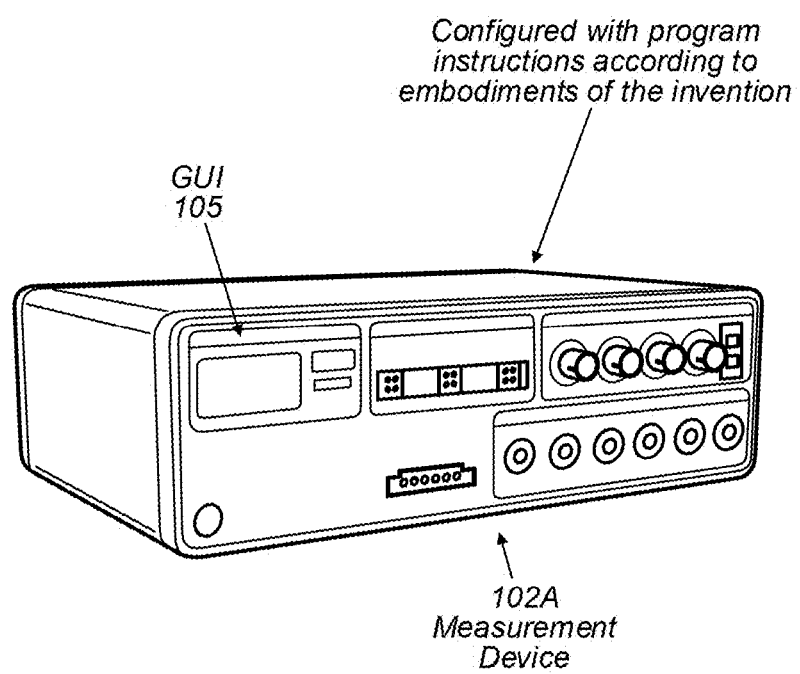
FIG. 1B illustrates an exemplary standalone measurement device configured to implement some embodiments described herein.

FIG. 1B—Computer Network

FIG. 1B illustrates another exemplary system implementing embodiments of the present techniques, specifically, a measurement device 102A configured to perform embodiments of the methods disclosed herein. Accordingly, measurement device 102A may include a processor and memory medium that stores program instructions executable by the processor to implement these techniques, e.g., driver software, user application(s), etc. Note that measurement device 102A includes a graphical user interface (GUI) 105 for user interactions with the device.

It should be noted, however, that the measurement devices 102 and 102A of FIGS. 1A and 1B are exemplary only, and, as noted above, any type of measurement device may be used as desired.

Exemplary Systems

Some embodiments may be involved with performing test and/or measurement functions; controlling and/or modeling instrumentation or industrial automation hardware; modeling and simulation functions, e.g., modeling or simulating a device or product being developed or tested, etc. Exemplary test applications where the present techniques may be used include hardware-in-the-loop testing and rapid control prototyping, among others.

However, it is noted embodiments described herein can be used for a plethora of applications and is not limited to the above applications. In other words, applications discussed in the present description are exemplary only, and some embodiments may be used in any of various types of systems. Thus, embodiments of the system and method may be configured to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 2A:
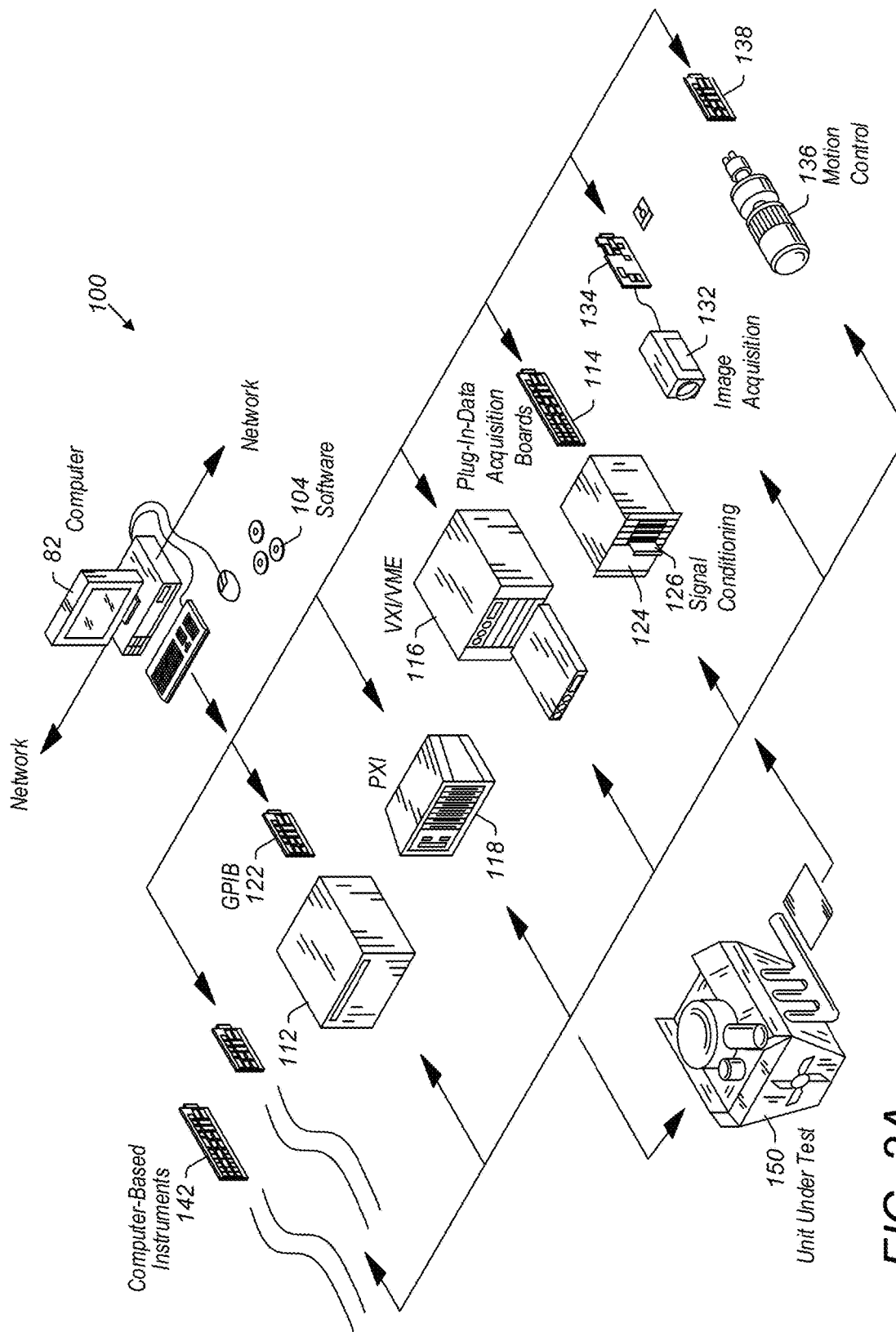
FIG. 2A illustrates an instrumentation control system according to some embodiments.

FIG. 2A—Exemplary Instrumentation Control System

FIG. 2A illustrates an exemplary instrumentation control system 100 which may implement embodiments described herein. The system 100 comprises a host computer 82 which couples to one or more instruments. The host computer 82 may comprise a CPU, a display screen, memory, and one or more input devices such as a mouse or keyboard as shown. The computer 82 may operate with the one or more instruments to analyze, measure or control a unit under test (UUT)

or process 150, e.g., via execution of software 104. In various embodiments, any of the instruments may be configured (possibly with the host computer 82) to implement and perform embodiments of the techniques disclosed herein.

The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to the unit under test (UUT) or process 150, or may be coupled to receive field signals, typically generated by transducers. The system 100 may be used in any kind of measurement related application as desired, e.g., a data acquisition and control application, in a test and measurement application, an image processing or machine vision application, a process control application, a man-machine interface application, a simulation application, or a hardware-in-the-loop validation application, among others.

Figure 2B:
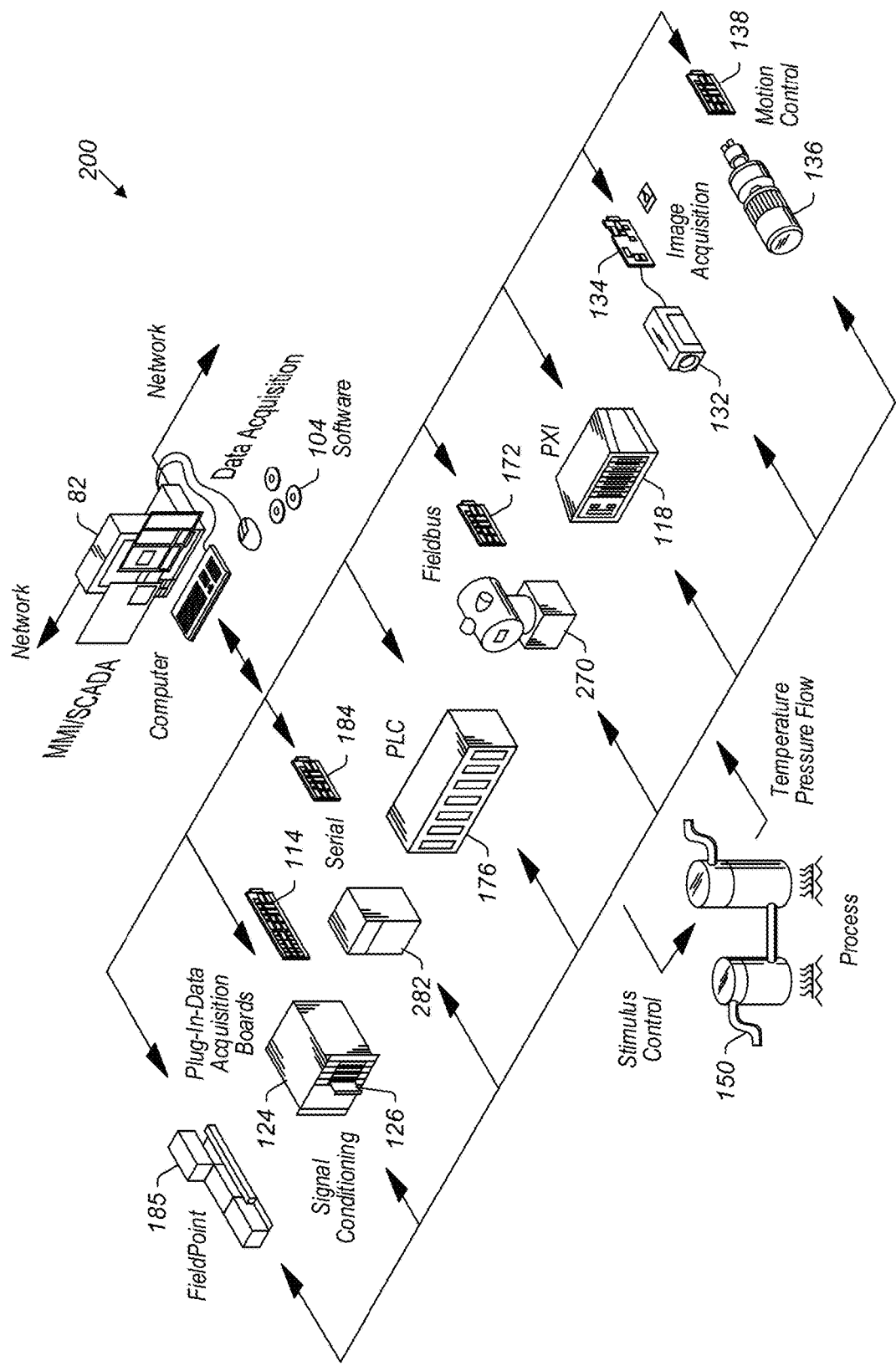
FIG. 2B illustrates an industrial automation system according to some embodiments.

FIG. 2B—Exemplary Industrial Automation System

FIG. 2B illustrates an exemplary industrial automation system 200 which may implement embodiments described herein. The industrial automation system 200 is similar to the instrumentation or test and measurement system 100 shown in FIG. 2A. Elements which are similar or identical to elements in FIG. 2A have the same reference numerals for convenience. The system 200 may comprise a computer 82 which couples to one or more devices or instruments. The computer 82 may comprise a CPU, a display screen, memory, and one or more input devices such as a mouse or keyboard as shown. The computer 82 may operate with the one or more devices to perform an automation function with respect to a process or device 150, such as MMI (Man Machine Interface), SCADA (Supervisory Control and Data Acquisition), portable or distributed data acquisition, process control, advanced analysis, or other control, among others, e.g., via execution of software 104.

As with the system of FIG. 2A, in various embodiments, any of the instruments may be configured (possibly with the host computer 82) to implement and perform embodiments of the techniques disclosed herein.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a fieldbus device 270 and associated fieldbus interface card 172, a PLC (Programmable Logic Controller) 176, a serial instrument 282 and associated serial interface card 184, or a distributed data acquisition system, such as Fieldpoint system 185, available from National Instruments Corporation, among other types of devices.

Figure 3A:
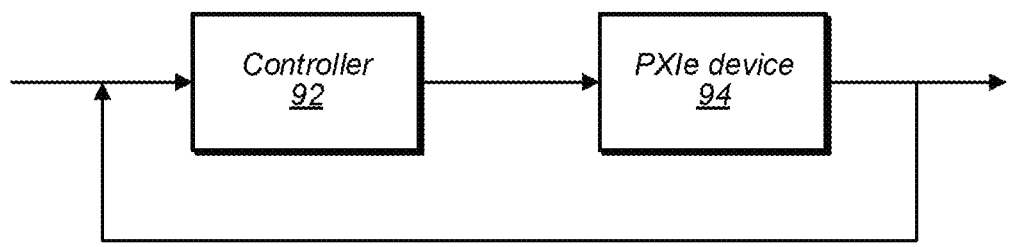
FIG. 3A is a high-level block diagram of an exemplary system which may execute or utilize graphical programs, according to some embodiments.
Figure 3B:
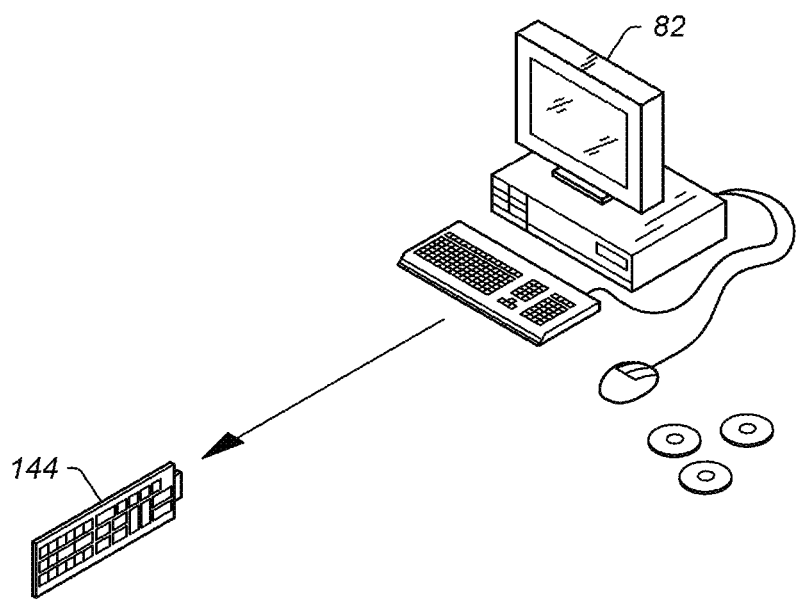
FIG. 3B illustrates an exemplary system which may perform control and/or simulation functions utilizing graphical programs, according to some embodiments.

FIGS. 3A-3B—Graphical Programming

FIG. 3A is a high-level block diagram of an exemplary system which may execute or utilize programs, e.g., graphical programs, according to the present techniques. FIG. 3A illustrates a general high-level block diagram of a generic control and/or simulation system which includes a controller 92 and a PXIe device 94. The controller 92 represents a control system/algorithm the user may be trying to develop. The PXIe device 94 represents the system the user may be trying to control. As shown, a user may create a graphical program that specifies or implements the functionality of one or both of the controller 92 and the PXIe device 94. For example, a control engineer may use a modeling and simulation tool to create a model (graphical program) of the PXIe device 94 and/or to create the algorithm (graphical program) for the controller 92.

FIG. 3B illustrates an exemplary system which may perform control and/or simulation functions. As shown, the controller 92 may be implemented by a computer system 82 or other device (e.g., including a processor and memory medium and/or including a programmable hardware element) that executes a program, e.g., a graphical program, to perform embodiments of the present techniques. In a similar manner, the plant 94 may be implemented by a computer system or other device 144 (e.g., including a processor and memory medium and/or including a programmable hardware element) that executes or implements a program, e.g., a graphical program, or may be implemented in or as a real physical system, e.g., a car engine.

In some embodiments, one or more graphical programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a graphical program, and the graphical program may execute on the controller 92, e.g., on a computer system or other device. The computer system 82 may be a platform that supports real time execution, e.g., a device including a processor that executes a real time operating system (RTOS), or a device including a programmable hardware element.

In some embodiments, one or more graphical programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a graphical program) is executed in real time to make the real controller 92 "believe" or operate as if it is connected to a real plant, e.g., a real engine.

In the embodiments of FIGS. 2A, 2B, and 3B above, one or more of the various devices may couple to each other over a network, such as the Internet. In one embodiment, the user operates to select a target device from a plurality of possible target devices for programming or configuration using a graphical program. Thus the user may create a graphical program on a computer and use (execute) the graphical program on that computer or deploy the graphical program to a target device (for remote execution on the target device) that is remotely located from the computer and coupled to the computer through a network.

Graphical software programs which perform data acquisition, analysis and/or presentation, e.g., for measurement, instrumentation control, industrial automation, modeling, or simulation, such as in the applications shown in FIGS. 2A and 2B, may be referred to as virtual instruments.

Figure 4:
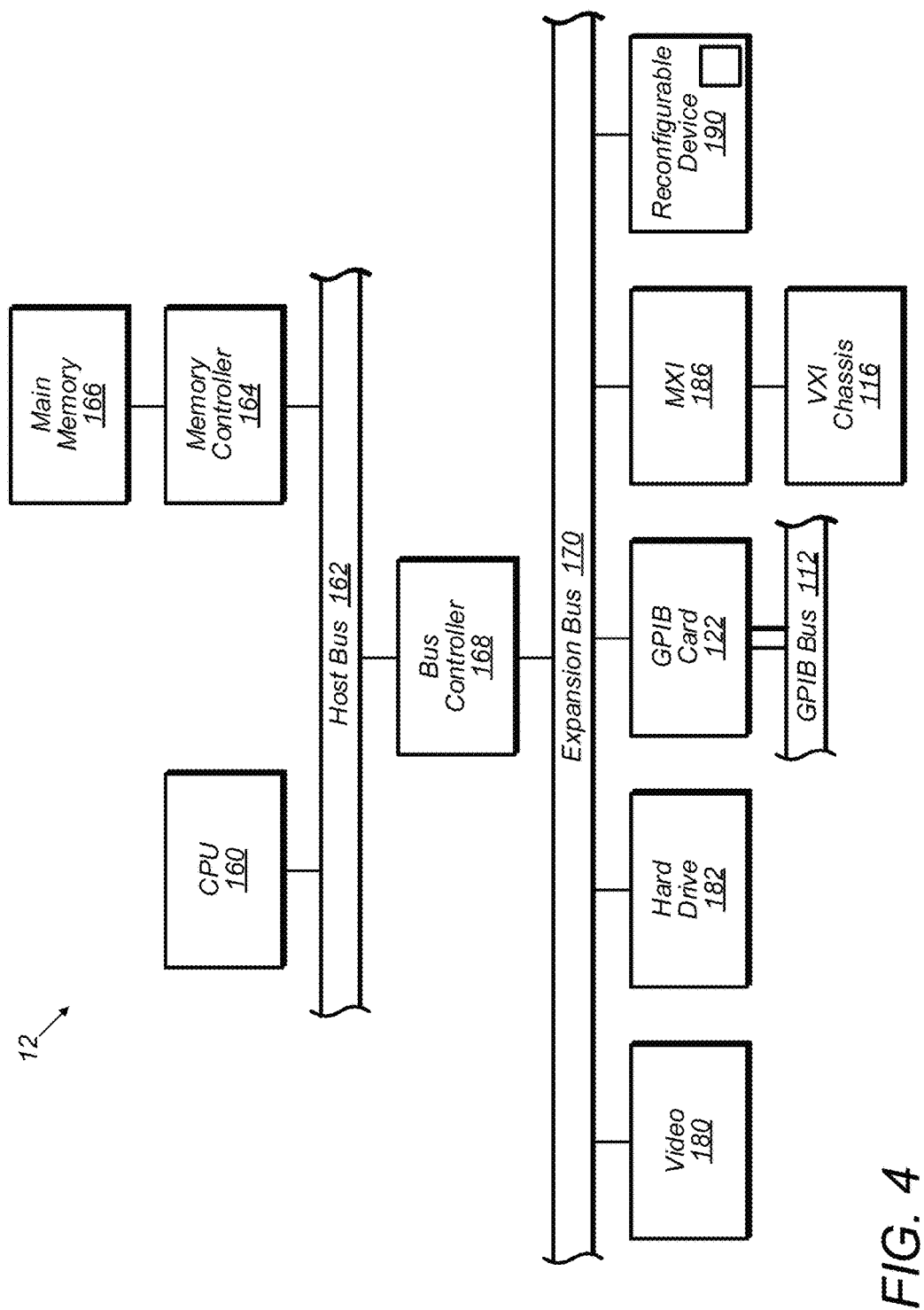
FIG. 4 is an exemplary block diagram of the computer systems of FIGS. 1A, 2A, 2B, and 3B, according to some embodiments.

FIG. 4—Computer System Block Diagram

FIG. 4 is a block diagram 12 representing one embodiment of the computer system 82 illustrated in FIG. 1A, or computer system 82 shown in FIG. 2A or 2B. It is noted that any type of computer system configuration or architecture can be used as desired, and FIG. 4 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store one or more programs configured to implement embodiments described herein, e.g., the configuration change tracking functionality described herein. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170. The computer 82 may also comprise a GPIB card 122 coupled to a GPIB bus 112, and/or an MXI device 186 coupled to a VXI chassis 116. More generally, as noted above, the computer 82 may be coupled to any of various measurement devices.

As shown, a device 190 may also be connected to the computer. The device 190 may include a processor and memory which may execute a real time operating system. The device 190 may also or instead comprise a programmable hardware element. The computer system may be configured to deploy a graphical program to the device 190 for execution of the graphical program on the device 190. The deployed graphical program may take the form of graphical program instructions or data structures that directly represents the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program.

Overview of Auto-Calculation of Measurement Uncertainty

Any measurement made by a physical measurement device may be associated with a measurement uncertainty. A measurement device 102 or 102A may be a modular measurement device that contains a plurality of configurable modules that are involved in a given measurement. As one nonlimiting example, a measurement may be performed by each of a power source and a power sink. Depending on the measurement, different modules may be inserted into or removed from the measurement device, and each of these modules may be configured with a particular set of instrument specifications. For example, a power source may be configured to operate with a particular frequency and a particular amplitude for a particular measurement. For a complex measurement performed jointly by a plurality of modules, the overall measurement uncertainty may be based on uncertainty contributions from each of the modules, and the uncertainty contribution from each module may be based on the current configuration of the respective module.

In some embodiments, implementations for calculating measurement uncertainty in a modular measurement device may rely on an exhaustive library (or look-up table) of all possible combinations of modules with each of a plurality of different configurations. Because of the large number of modules that may potentially be used in a measurement, and because each module may be configurable to operate according to a large number of different instrument specifications, the library may be extremely large and difficult to construct. Furthermore, the introduction of a new type of module, or the introduction of a new specification for a module, would require the entire library to be reconstructed to incorporate the new possible combinations of modules and specifications. Therefore, other embodiments described herein provide a novel method and devices for auto-calculating measurement uncertainty that may advantageously calculate measurement uncertainty without requiring an exhaustive library or look-up table.

In some embodiments, a measurement device may initiate a measurement through an abstraction layer, whereby the measurement device acquires one or more measurements. The initiation of the measurement through the abstraction layer may activate one or more measurement modules to participate in the one or more measurements. In some embodiments, one or more of the modules involved in a particular measurement may be composite modules, wherein the composite module comprises a plurality of electronic devices that collectively function as a single 'module' for the purposes of the measurement and the related uncertainty calculation.

The measurement device may communicate with a base driver of the measurement device, and may notify the base driver what type of measurement(s) have been initiated. The base driver may subsequently request uncertainty specifications from each of the modules involved in the measurement. The base driver may send a request message to each module involved in the measurement that specifies the types of uncertainty and the unit of uncertainty requested of each respective module. Herein, the terms "message" and "request message" may generally refer to any data structure or function that is communicated between elements of the measurement system. For example, the request message may be a message sent through a communication protocol, or it may be a callback or function pointer that is passed from the base driver to a respective module. The message may not be an actual communication and may instead be, for example, a direct method call resolved through dynamic dispatch. The request message may be a generic message that may be sent to a plurality of different types of modules. Each module that receives a request message may determine the requested uncertainty specification based on the current state of the module, and may send the requested uncertainty specification(s) to the base driver. The base driver may combine each of the received uncertainty specifications to obtain an overall uncertainty estimate for the measurement.

In some embodiments, a computer driver (e.g., an HTAP driver or another type of driver) may contain a dictionary that contains the driver's state at any given time. This dictionary may consist of all settings the driver might need to know, and this list of settings may vary by driver. In some embodiments, each of a plurality of modules comprised within a measurement device 102 or 102A is configured with a driver containing this type of dictionary. All settings needed to determine the value of an instrument specification of a module at any given time may be available in this dictionary. In some embodiments, the driver includes a converter from instrument settings to instrument specs, such that the instrument specification corresponding to a given configuration may be returned by the module upon request.

In some embodiments, this may be accomplished through a request message of the form:

$$[Value, Distribution, DegreesOfFreedom] = GetInstrumentSpec(Type, Unit) \quad (1)$$

In Equation 1, 'Type' represents the type of specification requested by the request message. For example, in some embodiments type may specify Voltage Standing Wave Ratio (VSWR), Frequency Accuracy, and Frequency Resolution, among other possibilities. 'Unit' represents the physical unit that the instrument specification should be described in (e.g., volts, hertz, megahertz, etc.). The GetInstrumentSpec request thereby requests a particular type and unit of instrument specification, and receives in response a value of the instrument specification, an uncertainty distribution associated with the instrument specification, and a number of degrees of freedom associated with the instrument specification.

Figure 5:
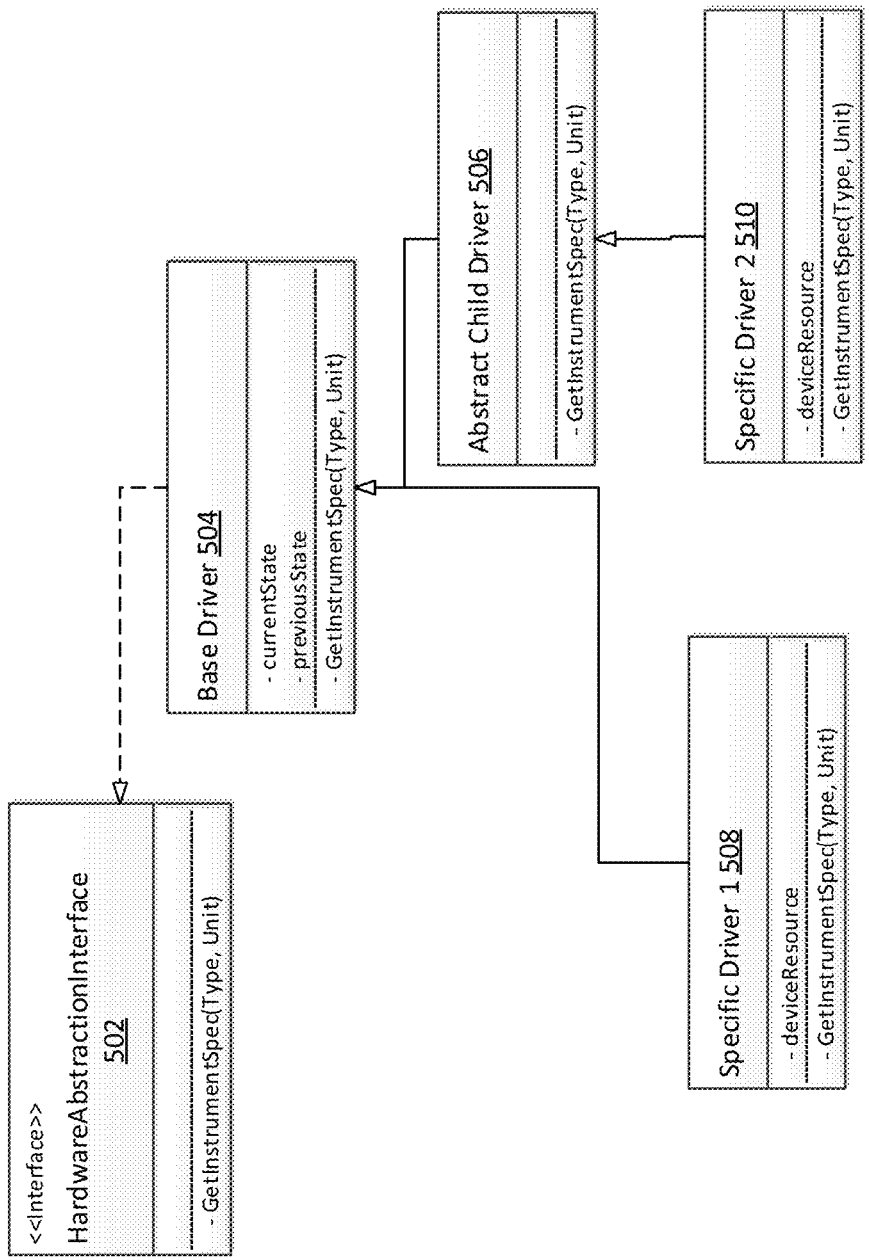
FIG. 5 is a Unified Modelling Language diagram illustrating exemplary techniques for auto-calculation of uncertainty, according to some embodiments.

FIG. 5—Exemplary UML for Auto-Calculation of Measurement Uncertainty

FIG. 5 illustrates a simple Unified Modelling Language (UML) diagram illustrating a technique for performing auto-calculation of uncertainty, according to some embodiments. In some embodiments, a hardware abstraction interface is used on top of the drivers, and this interface may provide a method with an identical prototype that re-directs to the driver method. As illustrated, Hardware Abstraction Interface 502 is initiated to perform a measurement, whereby a module of the device generates a measurement, which is returned to Hardware Abstraction Interface 502. HardwareAbstractionInterface 502 is an abstraction layer that sits above the individual driver abstractions. An example of this might be a 'DMM' interface or 'DoubleArrayAcquisition' interface. Additionally, Hardware Abstraction Interface exposes the GetInstrumentSpec method which is implemented by the drivers. A call to GetInstrumentSpec through the Hardware Abstraction Interface calls the base driver implementation which then steps down its hierarchy to the actual driver instance being used. That driver instance then executes GetInstrumentSpec to return the spec with the measurement's configuration back up to the Hardware Abstraction Interface.

As illustrated, the Base Driver 504 is a driver class that is the parent of all other driver classes and provides methods described herein that are implemented by all drivers and members that are shared by all drivers. The state members noted in Base Driver 504 are the ones that contain the state used for both configuration and uncertainty calculations in described embodiments.

As illustrated, Abstract Child Driver 506 is a driver that sits between the base driver and specific drivers to provide some common functionality. An example might be a shell driver whose children are 'Remote Specific Driver 2' (not shown) which is a driver for some non-local hardware, and 'Specific Driver 2' 510 that is a driver for some local hardware.

As illustrated 'Specific Driver 1' 508 and 'Specific Driver 2' 510 are at the bottom of the driver hierarchy that typically wraps hardware or other measurement tools directly and makes the most hardware-specific calls. In some embodiments, each of the drivers 506-510 may be included within one or more measurement modules, as described in further detail below.

Figure 6:
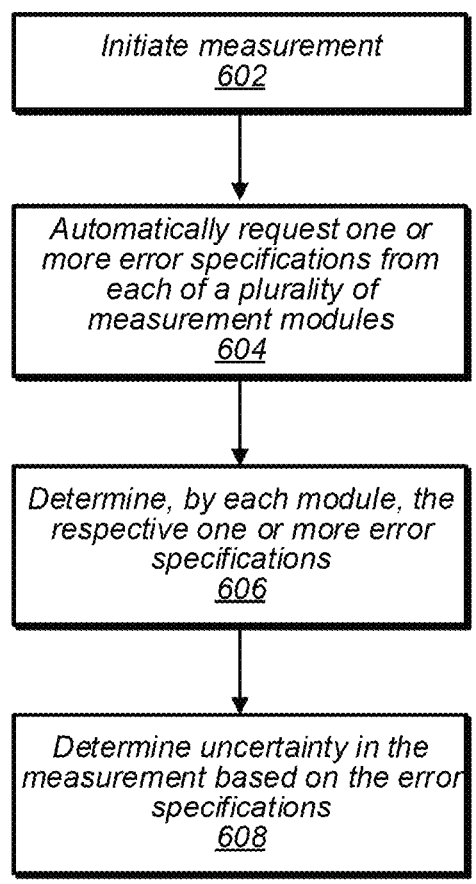
FIG. 6 is a flowchart diagram illustrating a method for auto-calculating measurement uncertainty by a measurement device, according to some embodiments.

FIG. 6—Autocalculation of Measurement Uncertainty

FIG. 6 is a flowchart diagram of a method for autocalculating measurement uncertainty, according to some embodiments. In some embodiments, autocalculation of measurement uncertainty may proceed as follows:

At 602, in the illustrated embodiment, the measurement device initiates a measurement function (e.g., a measurement). The measurement function may be initiated by a measurement controller of the measurement device, whereby the measurement controller may request one or more types of measurements from a plurality of modules. The measurement controller may operate using a customized driver or application which may, for example, include a user interface whereby a user may initiate the measurement function. The modules involved in the measurement function may be referred to herein as "measurement modules". The measurement device (or, more specifically, the measurement controller of the measurement device) may automatically send a notification to a base driver (e.g., base driver 504) that is configured to request error specifications from the modules that are involved in the measurement. The measurement device may be configured to notify the base driver of the type of measurement or measurements that have been initiated, whereby the base driver may be configured to identify the plurality of modules that are involved in the measurement or measurements. The base driver may further determine, based on the type of measurement or measurements that have been initiated, the types of error specifications that are required to calculate a measurement uncertainty for the type of measurement or measurements that have been initiated.

At 604, the measurement device (or, more specifically, the base driver), may automatically request one or more error specifications from each of the plurality of measurement modules. In some embodiments, the error specifications may be instrument specifications, and the error specifications may equivalently be referred to as "uncertainty components". In some embodiments, the instrument specifications may be an accuracy specification, a precision specification, a voltage standing wave ratio (VSWR) specification, or an attenuation specification. In some embodiments, an error specification may be determined from a combination of two or more instrument specifications. For example, in the case of a measurement involving a power source connected to a power sink with an attenuator, a voltage mismatch uncertainty may be determined from a combination of the accuracy of the source power, a resolution of the power sink, and the attenuation coefficient of the attenuator.

The request may be made by utilizing a request message, wherein a single type of request message may be utilized for each of the plurality of measurement modules. The request message may specify one or more types of error specifications, as well as a unit for each of the error specification.

At 606, each of the measurement modules may determine their respective one or more error specifications based on the current configuration of the measurement module. For example, each of the measurement modules may be configured in a particular way while conducting the measurement function. Upon receipt of the request message, each measurement module may consult a dictionary (or a look-up table) contained on a driver of the measurement module, whereby the measurement module may determine the requested error specification(s) based on the current configuration of the measurement module. The plurality of measurement modules may then each communicate the determined error specification(s) back to the base driver, for use in determining the measurement uncertainty.

Because the determination of error specifications is modularly controlled by each of the measurement modules, this method may easily be adapted to different configurations and sets of measurement modules. For example, if one of the measurement modules is replaced with a new, different measurement module, or if one or more of the measurement modules have had their configuration altered, the measurement controller and the base driver may accomplish a measurement uncertainty auto-calculation for a measurement function in an identical or substantially similar manner. For example, the measurement controller may perform the same (or a comparable) step 602 to initiate the measurement, and the base driver may send the same request message(s) at step 604, even though the measurement modules involved in the measurement function may have been altered. The new measurement module (or the measurement module with an altered configuration) simply consults its dictionary to determine the requested error specification(s) based on its current configuration, and returns the determined error specification(s) to the base driver.

At 608, the measurement device may determine the uncertainty in the measurement based on the error specifications. For example, the measurement device may combine the error specifications according to an error propagation calculation to calculate the overall uncertainty of the measurement based on the uncertainty components of each of the error specifications. In some embodiments, the measurement uncertainty may be determined further based on a variety of other factors, including an assumed uncertainty distribution of the measurement uncertainty and/or the uncertainty components, a number of degrees of freedom of the measurement, and a sensitivity of the measurement.

Figure 7:
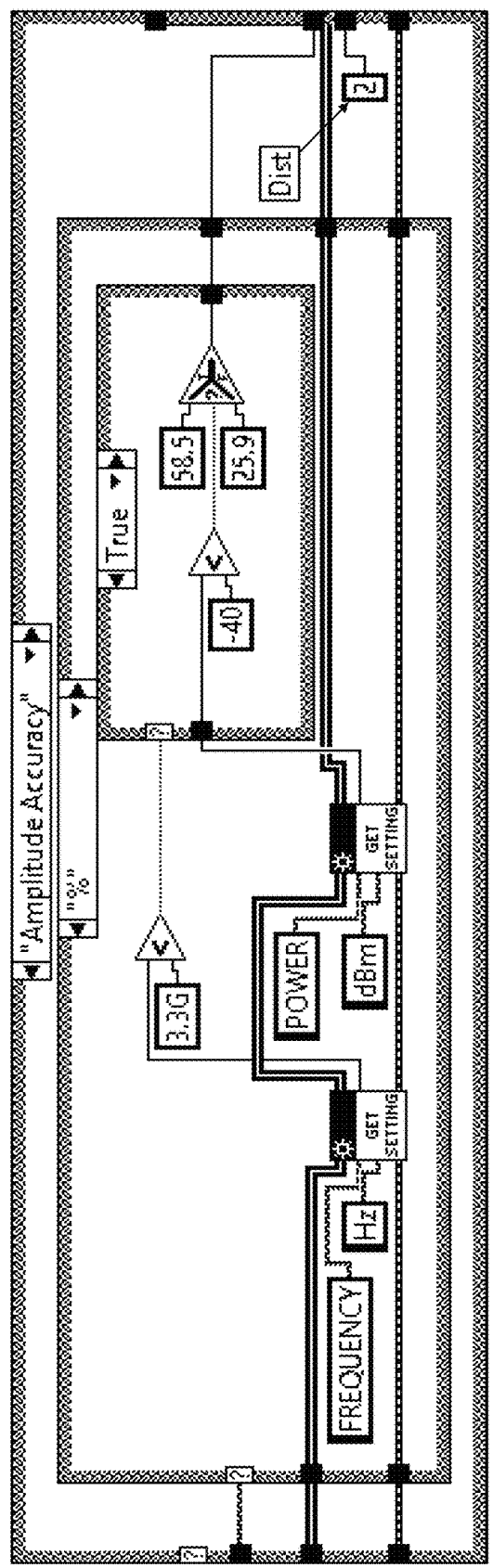
FIG. 7 is an example graphical program for determining an amplitude accuracy specification for a measurement, according to some embodiments.

FIG. 7—Amplitude Accuracy of PXIe-5652

FIG. 7 is an example graphical program for determining an amplitude accuracy specification for a measurement. In some embodiments the specification sheet for a device may describe how the amplitude accuracy specification depends on the frequency and the amplitude of the output. For example, FREQUENCY and POWER are two settings in the dictionary of settings for the PXIe-5652, and a sample implementation may proceed according to the graphical program illustrated in FIG. 6 (assuming a distribution coefficient of 2).

The returned unit is shown to be in percentage (%), but the GetInstrumentSpec request message could also request amplitude accuracy in other units such as dB, for example, based on the unit passed into the request message.

Figure 8:
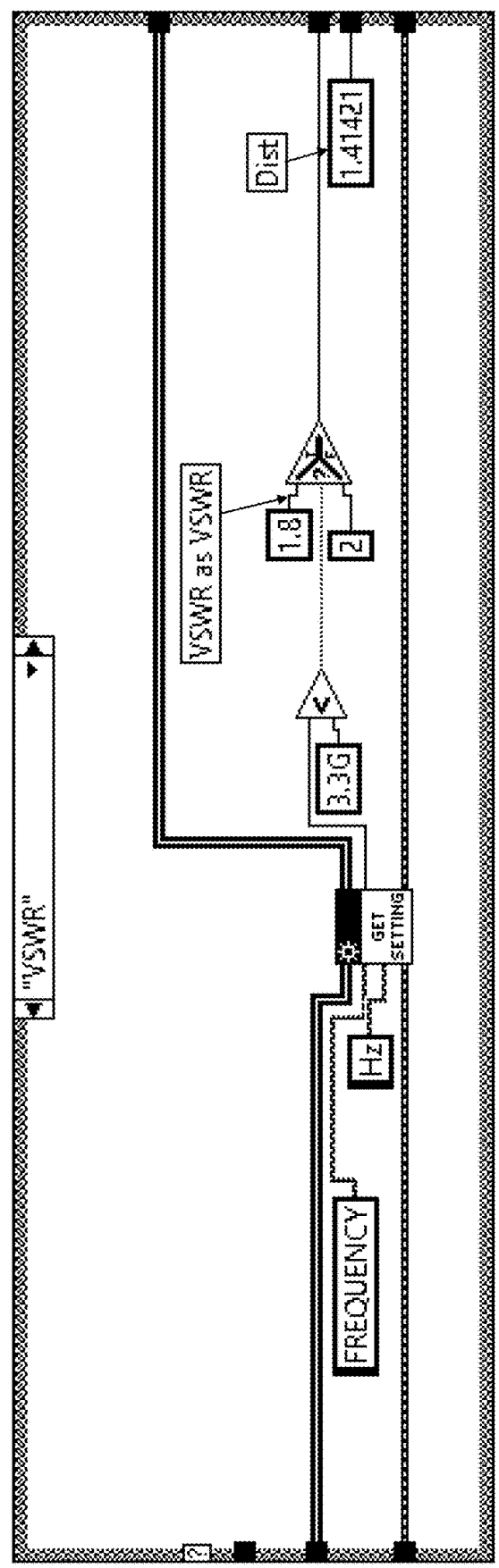
FIG. 8 is an example graphical program for calculating uncertainty in the voltage standing wave ratio (VSWR) during a measurement, according to some embodiments.

FIG. 8—VSWR of PXIe-5652

FIG. 8 is an example graphical program for calculating uncertainty in the voltage standing wave ratio (VSWR) during a measurement. A module's VSWR may depend on the device frequency. Thus, the FREQUENCY setting from the settings dictionary may be all that is needed to acquire the VSWR specification (assuming a distribution coefficient of sqrt(2)).

Measurement-Level Uncertainty

Measurement uncertainty may consist of all uncertainty components involved in a measurement. The uncertainty components may be made up of your device-under-test's (DUT's) type (e.g., type A) in addition to all other uncertainty components. As is known by those of skill in the art, "type A" herein refers to the standard error of the mean of repeated, independent measurements of a configuration (in contrast to non-type A or "type B", which refers to uncertainty that is generally derived from specification sheets, uncertainty handbooks, etc., i.e., rather than from live measurements). Embodiments described herein can handle non-type A dynamic aspects. In some embodiments, type A plus other fixed uncertainties (e.g., mismatch with a splitter) may contribute to the overall measurement uncertainty. The uncertainty components may be known at the measurement level.

In some embodiments, a measurement method written using the measurement functions (e.g., in HTAP, using an abstracted driver, or the Hardware Abstraction Interface) may use the 'GetInstrumentSpec' methods from above to get the components from the actual instruments being used in their actual current configurations. The request for component specifications may be called by a higher-level measurement uncertainty method that returns the overall measurement uncertainty for a measurement.

In some embodiments, and as described in further detail below, an uncertainty component may be returned from each measurement module with the following components: Specification (or Spec), Distribution, Degrees of Freedom (DOF), and Sensitivity. In these embodiments, the following equation may be used for measurement uncertainty for a measurement:

$$[\text{Value},\text{Unit}]=\text{CalculateUncertainty}(\text{Measurement}, \text{Unit},\text{TypeAUncComponent}) \quad (2)$$

In this equation, a module receives a request that specifies a specification value and a unit. The module then calculates the uncertainty in this value based on the fields "Measurement," "Unit," and "TypeAUncComponent". The 'Measurement' here is the type of measurement you are making, the 'Unit' is the output unit you want for your measurement uncertainty, and the 'TypeAUncComponent' is the type A component represented according to the definition above (spec, DOF, etc.). This method is very specific to each measurement.

Helper Library

Figure 9:
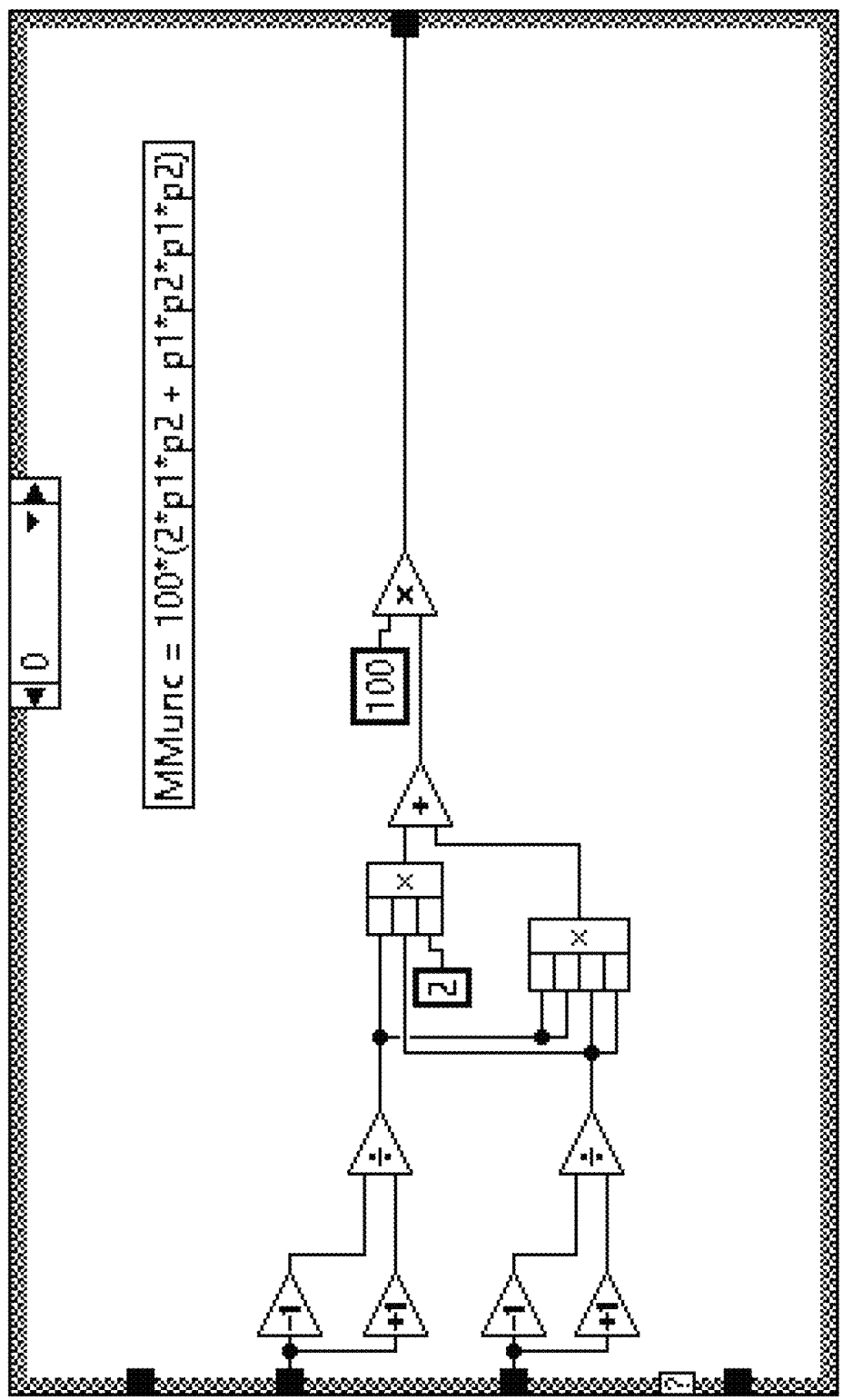
FIG. 9 is an example graphical program for obtaining a mismatch uncertainty based on two devices together without an attenuator, according to some embodiments.

In some embodiments, standard calculations may be made for uncertainty calculations, and a standard library may be used to facilitate this process. For example, in some embodiments, the calculation may provide a method for converting a list of uncertainty components into an expanded uncertainty. Some embodiments may provide a method for performing unit conversions. Some embodiments may provide a method for converting a series of VSWRs and attenuations into a mismatch uncertainty. For example, FIG. 9 illustrates an exemplary standard calculator that may be employed to obtain a mismatch uncertainty as a percentage based on two devices connected directly together with no attenuator in between. In various embodiments, a standard library or look-up table may be employed to perform the relevant calculations, once the uncertainty components are acquired from the modules.

Figure 10:
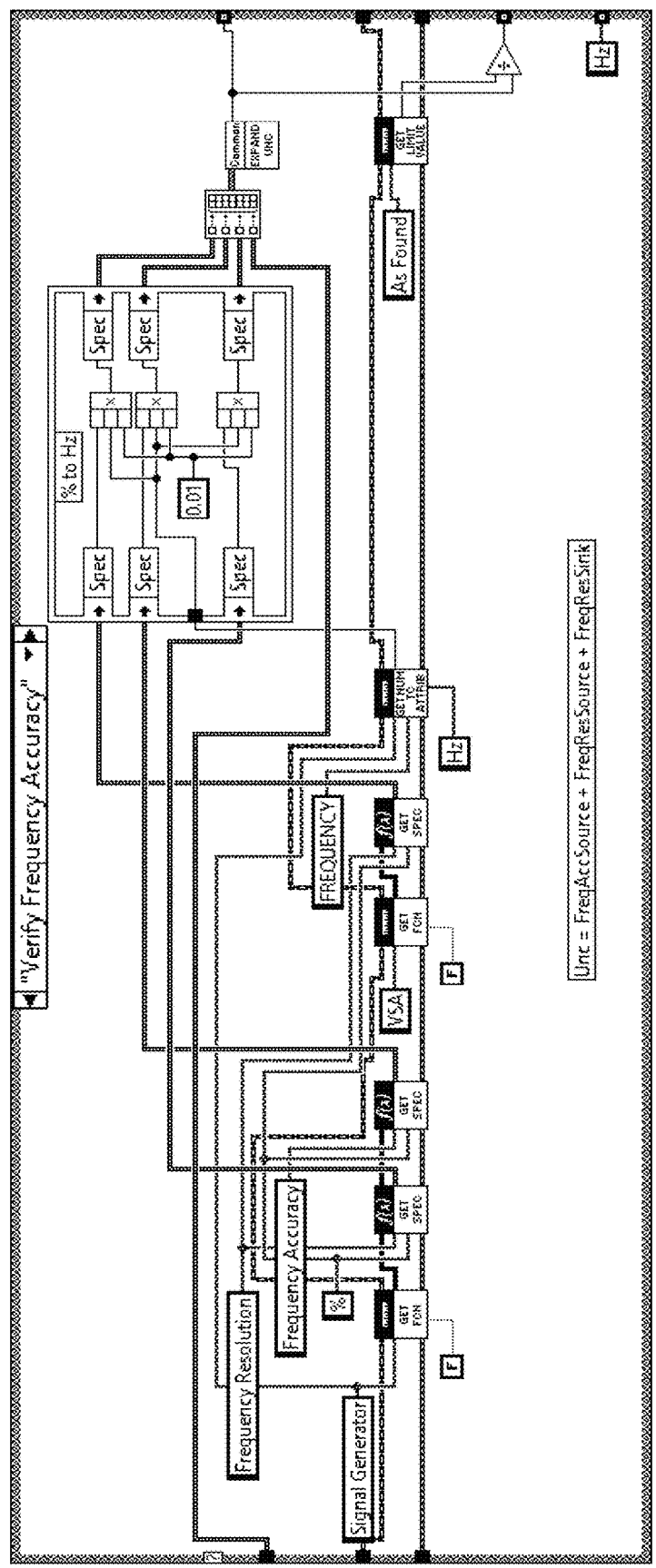
FIG. 10 is an example graphical program for calculating uncertainty when a vector signal analyzer (VSA) measures frequency from a signal generator, according to some embodiments.

FIG. 10—Vector Signal Analyzer (VSA) Measuring Frequency from a Signal Generator FIG. 10 is an example graphical program for calculating uncertainty when a vector signal analyzer (VSA) measures frequency from a signal generator. In some embodiments, a VSA that is measuring a frequency originating from a signal generator may contain a measurement uncertainty that depends on the frequency accuracy of the source, the frequency resolution of the source, the frequency resolution of the sink, and type A. The measurement uncertainty may further depend on the frequency in question. By employing the 'GetInstrumentSpec' method that is described above, the specifications may be returned as long as the type and unit are requested.

As illustrated in FIG. 10 the 'Get Fcn' icons represent a method whereby the instruments are looked up by name.

The 'Get Spec' icons indicate the 'GetInstrumentSpec' methods described above, the 'Get Num TC Attrib' icon indicates a method that looks up the current measurement state and acquires the test frequency, the 'Expand Unc' icon indicates the method described earlier in the helper library that converts a list of uncertainty components into an expanded uncertainty, and the 'Get Limit Value' icon indicates a method that returns the limit for the test and is used here to calculate the test uncertainty ratio (TUR). The box labeled "% to Hz" indicates a calculation to convert the instrument specs in percentage into uncertainty components in Hz using the test frequency.

In some embodiments, the methods described herein may determine measurement uncertainty without requiring specification of a type of signal generator being used, or whether a signal generator is being used due to the use of Hardware Abstraction Interfaces. Since the modules have been configured to perform the measurement and the same configuration is used to calculate the instrument specifications, an advantage of the methods described herein is that they may adapt to what instruments are currently being used in the actual configurations being used.

Figure 11:
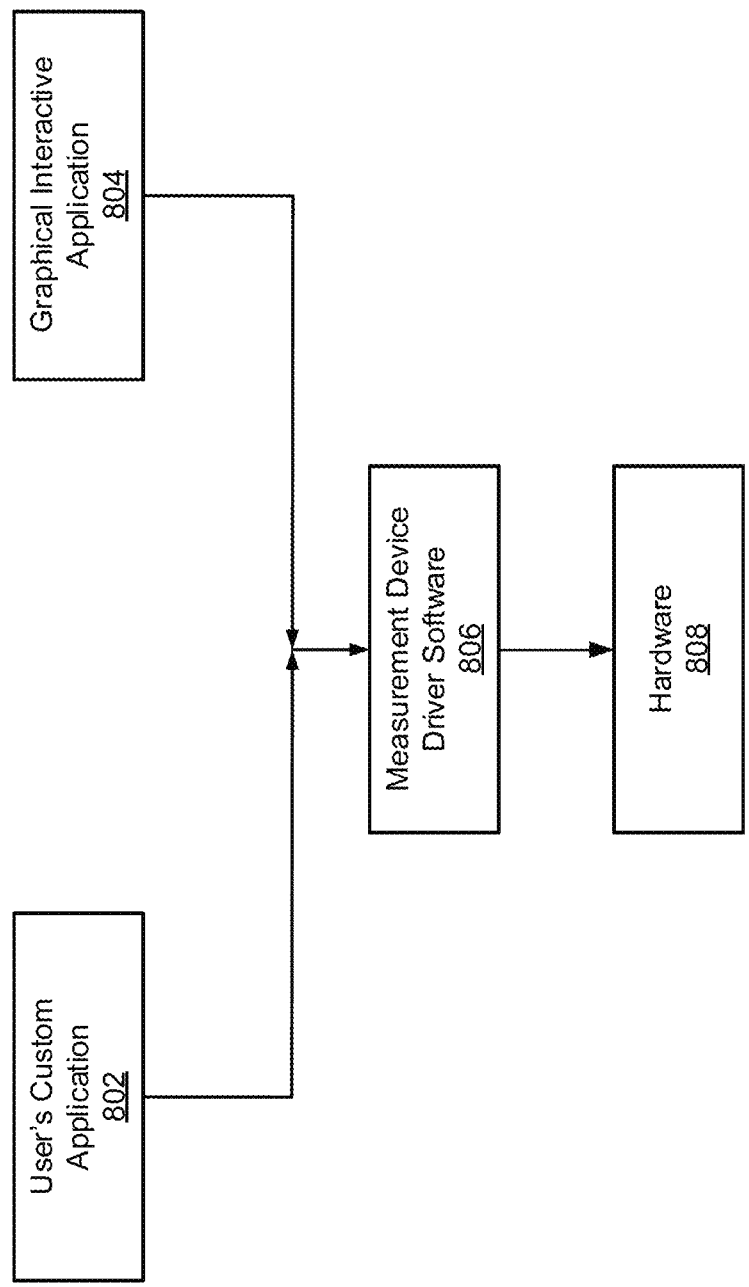
FIG. 11 illustrates an exemplary high-level system architecture, according to some embodiments.

FIG. 11—Exemplary Architecture

FIG. 11 illustrates an exemplary high level system architecture, according to some embodiments. As indicated, a user's custom application 802 and a graphical interactive application 804, e.g., a software tool or component that implements an embodiment of the above-described GUI, may operate in conjunction with or through measurement device driver software 806, to configure and otherwise interact with hardware 808, i.e., the measurement device. Note that in various embodiments, the custom application, the graphical interactive application (or tool/GUI), and/or the measurement device driver software, may be implemented or executed on a host computer or controller or on the measurement device itself, e.g., the hardware (808).

Thus, embodiments of the techniques described herein may facilitate configuration change tracking and associated functionality for a measurement device.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A measurement device comprising:
a plurality of hardware modules coupled to a measurement controller; and
a processor coupled to the plurality of hardware modules, wherein the processor is configured to execute program instructions of a driver;
wherein the measurement controller is configured to initiate a measurement by the plurality of hardware modules;
wherein execution of the program instructions cause the processor to request one or more error specifications from each of the plurality of hardware modules;
wherein each of the plurality of hardware modules are configured to:
determine the respective one or more error specifications based on a current configuration of the respective hardware module; and
transmit the determined error specifications to the processor; and
wherein execution of the program instructions further cause the processor to determine an uncertainty in the measurement based on the error specifications.

2. The measurement device of claim 1,
wherein the requests for one or more error specifications specify at least one of a type of error and a unit of error.

3. The measurement device of claim 1,
wherein the plurality of hardware modules are configured to utilize a look-up table to determine the respective one or more error specifications based on their current configuration.

4. The measurement device of claim 1,
wherein the error specifications comprise one or more of:
instrument specifications; or
combinations of two or more instrument specifications.

5. The measurement device of claim 4,
wherein the instrument specifications comprise one or more of an accuracy specification, a precision specification, a voltage standing wave ratio (VSWR) specification, or an attenuation specification; and
wherein the combinations of two or more error specifications comprise a mismatch uncertainty.

6. The measurement device of claim 1,
wherein one or more of the plurality of hardware modules is a composite hardware module comprising a plurality of electronic devices.

7. The measurement device of claim 1,
wherein the processor requests one or more error specifications from the plurality of hardware modules by sending request messages, wherein the processor is configured to send the same type of request message to each of the plurality of hardware modules.

8. The measurement device of claim 1, wherein the measurement device comprises one or more of:
a standalone instrument;
a hardware module in a chassis;
a chassis with a plurality of hardware modules; or
a device comprising:
a software component, executable on a host computer; and
a hardware component, coupled to the host computer.

9. A computer-implemented method for calculating uncertainty in a measurement device, the method comprising:
initiating, by the measurement device, a measurement;
in response to initiating the measurement, automatically requesting one or more error specifications from each of a plurality of hardware modules of the measurement device that are involved in the measurement;
determining, by each of the plurality of hardware modules, the respective one or more error specifications based on a current configuration of the respective hardware module;
determining an uncertainty in the measurement based on the error specifications.

10. The computer-implemented method of claim 9,
wherein the one or more error specifications are requested from the plurality of hardware modules by utilizing a respective plurality of request messages, wherein the same type of request message is utilized for each of the plurality of hardware modules.

11. The computer-implemented method of claim 9,
wherein the requests for one or more error specifications specify at least one of a type of error and a unit of error.

12. The computer-implemented method of claim 9,
wherein the error specifications comprise one or more of:
instrument specifications; or
combinations of two or more instrument specifications.

13. The computer-implemented method of claim 12,
wherein the instrument specifications comprise one or more of an accuracy specification, a precision specification, a voltage standing wave ratio (VSWR) specification, or an attenuation specification; and
wherein the combinations of two or more error specifications comprise a mismatch uncertainty.

14. The computer-implemented method of claim 9,
wherein the determining the uncertainty is further based on one or more of:
an uncertainty distribution;
a number of degrees of freedom of the measurement; or
a sensitivity of the measurement.

15. The computer-implemented method of claim 9, wherein the measurement device comprises one or more of:
a standalone instrument;
a chassis comprising the plurality of hardware modules; or
a device comprising:
a software component, executable on a host computer; and
a hardware component, coupled to the host computer.

16. A non-transitory computer accessible memory medium that stores program instructions executable by a processor included in a measurement device to:
receive a notification that a measurement has been initiated;
in response to receiving the notification, automatically request one or more error specifications from each of a plurality of hardware modules of the measurement device, wherein the plurality of hardware modules are involved in the measurement;
receive the one or more error specifications from each of the plurality of hardware modules, wherein each one or more error specification is based on a current configuration of the respective hardware module; and
determine an uncertainty in the measurement based on the error specifications.

17. The non-transitory computer accessible memory medium of claim 16,
wherein the program instructions are further executable to request one or more error specifications from the plurality of hardware modules by sending request messages, wherein the same type of request message is sent to each of the plurality of hardware modules, and wherein the request message specifies at least one of a type of error and a unit of error.

18. The non-transitory computer accessible memory medium of claim 16,
wherein the notification that the measurement has been initiated specifies the type of measurement that has been initiated;
wherein the program instructions are further executable to cause the processor to identify, based on the notification, the plurality of hardware modules from which to request the error specifications.

19. The non-transitory computer accessible memory medium of claim 16,
wherein the error specifications comprise one or more of:
instrument specifications; or
combinations of two or more instrument specifications.

20. The non-transitory computer accessible memory medium of claim 16, wherein the measurement device comprises one or more of:
a standalone instrument;
a chassis comprising the plurality of hardware modules; or
a device comprising:
a software component, executable on a host computer; and
a hardware component, coupled to the host computer.

* * * * *